May 17, 1932.  M. J. HANLON  1,859,139
BOW CONSTRUCTION FOR SHIPS
Filed Sept. 24, 1931  2 Sheets-Sheet 1
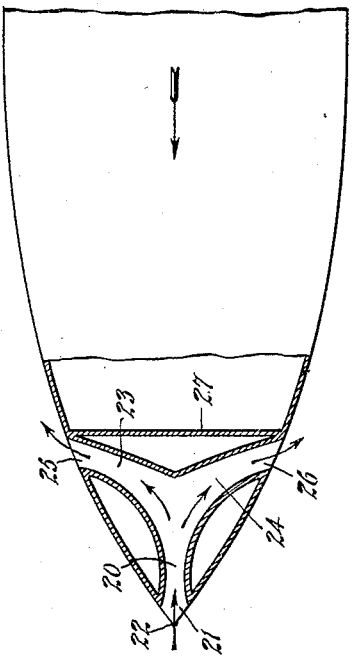
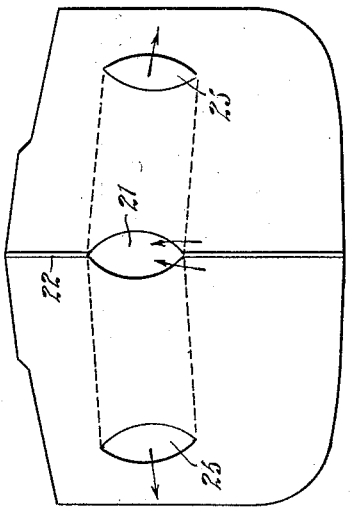
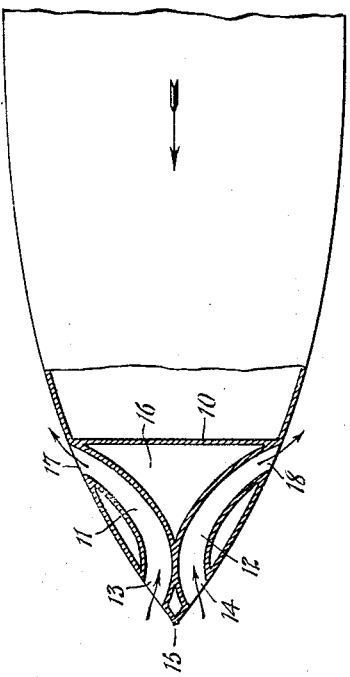
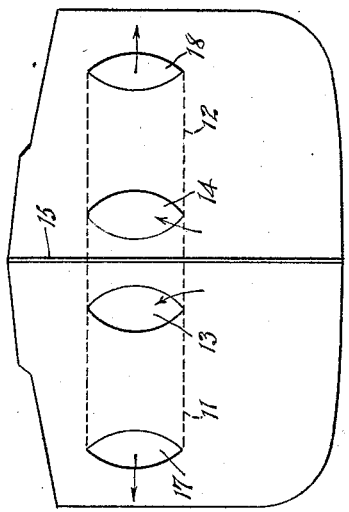
WITNESSES
INVENTOR
Michael J. Hanlon
BY
ATTORNEY May 17, 1932.  M. J. HANLON  1,859,139
BOW CONSTRUCTION FOR SHIPS
Filed Sept. 24, 1931   2 Sheets-Sheet 2

WITNESSES
Edw. Thorpe
Hugh N. Ott

INVENTOR
Michael J. Hanlon
BY
ATTORNEY

Patented May 17, 1932

1,859,139

UNITED STATES PATENT OFFICE

MICHAEL J. HANLON, OF WEEHAWKEN, NEW JERSEY

BOW CONSTRUCTION FOR SHIPS

Application filed September 24, 1931. Serial No. 564,941.

This invention relates to naval architecture, and has more particular reference to an improved bow structure for watercraft of either wind or power propelled types, and by virtue of which structure a substantial decrease in the head resistance of the vessel is effected.

It has been observed that the bow wave resulting from the forward motion of a vessel through the water tends to materially retard and greatly resist its forward progress and requires an excessive expenditure of power, while substantially affecting its speed. This bow wave results from the disturbance, agitation or turbulence of the water thrown up against the bows of the vessel and creates adjacent the stem at the forward portion of the bows, an area of positive pressure, while in rear thereof the dip in the bow wave presents areas of negative pressure.

It is, therefore, the broad object of the present invention to design or construct the bow of a vessel so as to minimize the agitation, disturbance or turbulence of the water at this point, in order to flatten out the bow wave and to reduce to a marked degree the retardation and resistance offered to the forward progress of the vessel, wherein the power requirement may be reduced and/or the speed increased.

More particularly, the invention comprehends a bow structure for watercraft embodying ducts or passages formed within the confines thereof which are designed of a sufficient area and so located that the flow of water from the region of positive pressure to the region of negative pressure through said ducts or passages is available at any predetermined draft of the vessel, whereby the maximum load draft or the draft when the vessel is fully laden and requires the maximum power for propulsion, affords means for reducing the forward or positive pressure around the bows and will allow the turbulent, disturbed or agitated water to flow back and discharge into the region of negative pressure.

The invention further aims to provide an improved bow construction having ducts or passageways of the indicated character and for the purpose specified, the configuration and shape of which are such that they provide for natural and easy flow of the water therethrough with a minimum of internal resistance to the water particles and wherein the contour of said ducts or passages follows accurately the predetermined lines of positive pressure and leads smoothly into the region of negative pressure, where the water being pushed forward by the bows of the vessel is discharged through the ducts with a consequent reactive forward thrust on the hull, thereby further gaining an increase in the propulsive coefficient of the hull.

The invention further resides in an improved hull structure of the character set forth which may be readily and inexpensively built into or incorporated in existing ships, with a minimum loss of the ship's time and earning power, or built into or incorporated in new ships during their course of construction without materially increasing the cost thereof.

With the above recited and other objects in view, reference is had to the following specification and accompanying drawings, in which there are illustrated several preferred embodiments of the invention, while the claims define the actual scope thereof.

In the drawings:

Figure 1 is a fragmentary diagrammatic plan view of a ship's hull, with parts broken away and shown in section to disclose the underlying improved structural features exemplifying one form of the invention.

Figure 2 is an enlarged front view thereof.

Figure 3 is a view similar to Figure 1, illustrating a modified adaptation of the invention.

Figure 4 is a front elevation of the form of the invention illustrated in Figure 3.

Figure 8:
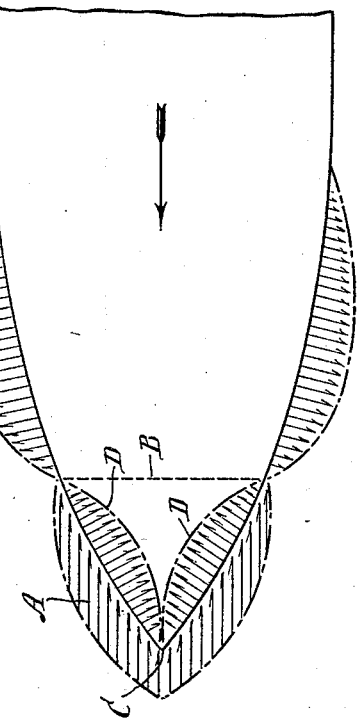
Figure 8 is a diagrammatic plan view illustrating the pressure areas which are developed by the bow wave during the forward motion of the ship through the water.

In order to clearly understand the invention, reference is first made to the diagram illustrated in Figure 8, in which the pressures and direction of forces obtaining about the fore body and bows of a ship's hull in motion, are pictured. In this diagram, the lines of force A which develop the region of positive pressure, extend inside of the line of the ship's hull into the space known as the fore peak which is defined between the transverse broken line B and the portion of the bows which extends therefrom to the stem C. By way of illustration, the concave dot and dash lines D demonstrate the hull deflection if it were assumed that the hull were compressible by lines of force acting thereupon. Likewise, the convex or bowed dot and dash lines E immediately in rear of the fore peak on opposite sides of the bow define together therewith the regions of negative pressure indicated by the lines of force F, and, theoretically, if the hull were of a flexible material, the hull would bulge outwardly at this point to approximately the form indicated by the lines E. This theoretical deformation of the contour of the bows of the vessel would be the natural shape required by the water streams at this point reacting to the forces to which they are subjected. However, in view of the fact that the water streams cannot be allowed to pursue their natural bend or streamlines on account of the rigidity of the construction of the vessel, they are forced outward at the sides of the bows and upward at the stem, resulting in an immense turbulence and state of agitation and, in effect, an increased draft forward, all of which function to retard the speed of the vessel and require an increased power propulsion efficiency. By actual observation, it has been noted that the region of negative pressure occurs outside of the line of the ship's hull, beginning at a point coincident with the location of the fore peak bulkhead and moving away from the hull in a wave which is not constrained to move in any particular path but is free and untrammeled.

In order to take advantage of the definite knowledge of the existence of these positive and negative pressure areas and to provide means for the flow of the turbulent, agitated or disturbed water known as the bow wave, the present invention as illustrated in Figures 1 and 2 comprehends a bow structure which is so fashioned in advance of the fore peak bulkhead 10 as to provide two separate ducts or passages 11 and 12 which are of curved or substantially arcuate formation and which are provided with inlet or intake forward ends 13 and 14 opening respectively on opposite sides of the bow in close proximity to the stem post 15 and passing through the fore peak space 16. These ducts or passages 11 and 12 are respectively provided with outlets or discharge ends 17 and 18 which open through or emerge from the bows aft of their intakes or inlets 13 and 14 and approximately adjacent the line of the fore peak bulkhead 10 and at the leading portion of the area of negative pressure. Obviously, the vertical position of the intake or inlet and the outlet or discharge ends of the passages or ducts will be governed by the draft of the vessel so as to be made available at a predetermined draft, preferably the maximum load draft or when the vessel is fully laden and requires the maximum power for propulsion. Consequently, as the vessel is driven forward through the water, the ducts or passages afford a means for the flow therethrough of the turbulent, agitated or disturbed water or bow wave from the region of positive pressure to the region of negative pressure. It will thus be found that the propulsive coefficient of the hull known as $$\frac{E.\ H.\ P.}{S.\ H.\ P.} = X$$

(where E. H. P. is the effective horse power and S. H. P is the total shaft horse power produced by the main propelling machinery) will be greatly increased in existing ships when equipped with these ducts, thereby resulting in a higher speed with the same fuel consumption, or will permit new ships equipped with these ducts to meet their guarantees of speed with less propelling power and a minimum of fuel consumption. It will be further observed that the water emerging from the outlets or discharge ends 17 and 18 will set up a reactive forward thrust on the hull, thus again increasing the propulsive coefficient thereof.

Figure 5:
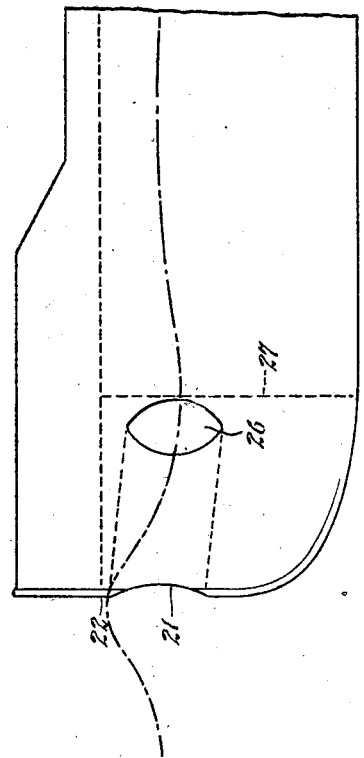
Figure 5 is a side elevation of the form of the invention illustrated in Figures 3 and 4.

In the form of the invention illustrated in Figures 3, 4 and 5, a central longitudinally extending duct or passageway 20 has a single inlet or intake 21 opening through the stem 22, and the rear portion of said duct or passageway is provided with laterally divergent branches 23 and 24 which are provided with rearwardly disposed outlets or discharge ends 25 and 26 which open through the opposite sides of the bow substantially at the fore peak bulkhead 27. In this instance, it will be observed that the outlets or discharge ends 25 and 26 are disposed in a lower plane or level than the inlet or intake end 21, and the purpose thereof is to insure the intake of the higher point of the bow wave at the maximum draft, while, due to the dip in the rear of the bow wave, the said outlets or discharge ends 25 and 26 may be disposed at a lower point and still be effective without any appreciable back pressure. It will be further observed that the substantially Y-shaped passageway thus defined has a more or less comparatively restricted area than the passageway 20, which flares or increases in area rearwardly at its juncture with the branches 23 and 24, thus positively insuring against any back pressure. In its general purpose, the action and result accomplished are substantially identical with that set forth in connection with the form of the invention illustrated in Figures 1 and 2.

Figure 6:
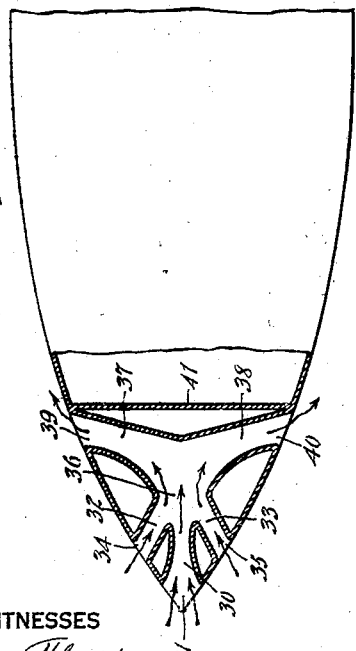
Figure 6 is a plan view similar to Figures 1 and 3, illustrating a further form of the invention.
Figure 7:
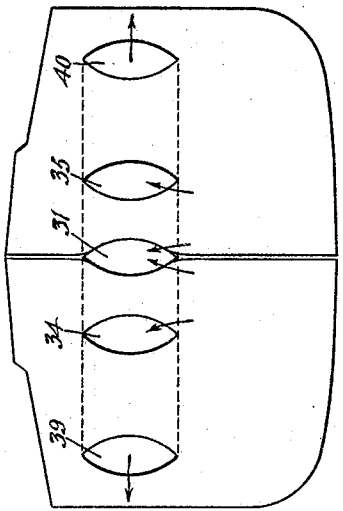
Figure 7 is a front elevation thereof.

In the form of the invention illustrated in Figures 6 and 7, the hull is provided with a central or intermediate duct or passage 30, which has an inlet or intake forward end 31 opening through the stem of the vessel and a pair of forwardly divergent and rearwardly convergent side passages or ducts 32 and 33 which are respectively provided with intake or inlet forward ends 34 and 35 opening through the opposite sides of the bow structure. The intermediate and side passages or ducts 30, 32 and 33 all merge into and communicate with each other in a common passageway or duct 36 which is provided with laterally and rearwardly divergent branches 37 and 38 formed with rear outlet or discharge ends 39 and 40 opening through the opposite sides of the bow structure approximately at the fore peak bulkhead 41. This variation in the structure, however, accomplishes in a general way the same result as set forth in connection with the previously described forms of the invention and operates to intake the water of the bow wave at the area of positive pressure and to discharge the same at the region of negative pressure.

In all of the forms of the invention illustrated, it will be observed that the reconstruction of the bow portion of the hull at the fore peak space does not seriously interfere with the cargo space, which is located aft of the fore peak bulkhead.

While there have been illustrated and described several preferred forms of the invention, it is to be understood that no limitation is intended to the precise structural details herein exhibited, but that variations and modifications which properly fall within the range of the appended claims may be resorted to when desired.

What is claimed is:

1. A hull for watercraft having a bow portion formed with a water passage extending through the fore peak, said passage having an intake adjacent the stem for admitting water at the region of positive pressure and having lateral and rearward outlets for discharging the water at the region of negative pressure, said passage being located substantially in a horizontal plane passing through the bow wave.

2. A hull for watercraft comprising a fore peak having a pair of independent water passages extending fore and aft and each having a forward inlet opening through the respective sides of the bow on opposite sides of the stem and each having an outlet opening through the respective sides of the bow at a point in rear of the inlet, said passages being located substantially in a horizontal plane passing through the bow wave.

3. A hull for watercraft comprising a fore peak having a pair of independent water passages extending fore and aft and each having a forward inlet opening through the respective sides of the bow on opposite sides of the stem and each having an outlet opening through the respective sides of the bow at a point in rear of the inlet, said passages being of generally arcuate formation with the concave sides thereof disposed laterally, and disposed substantially in a horizontal plane passing through the bow wave.

MICHAEL J. HANLON.